United States Patent [19]

Mundra

[11] Patent Number: 4,890,232

[45] Date of Patent: Dec. 26, 1989

[54] DISPLAY AID FOR AIR TRAFFIC CONTROLLERS

[75] Inventor: Anand D. Mundra, Takoma Park, Md.

[73] Assignee: The Mitre Corporation, Bedford, Mass.

[21] Appl. No.: 150,775

[22] Filed: Feb. 1, 1988

[51] Int. Cl.[4] .............................................. G06F 15/48

[52] U.S. Cl. .................................... 364/439; 364/428; 342/36

[58] Field of Search ........................ 364/427, 428, 439; 73/187 T; 342/33, 34, 35, 36, 37, 456; 340/947, 951, 954; 244/175, 75 R

[56] References Cited

U.S. PATENT DOCUMENTS

| | | | |
|---|---|---|---|
| 3,088,107 | 4/1963 | Martienssen et al. | 364/439 |
| 3,178,704 | 4/1965 | Moore et al. | 364/439 |
| 4,316,252 | 2/1982 | Cooper | 364/428 |
| 4,554,545 | 11/1985 | Lowe | 364/428 |

OTHER PUBLICATIONS

Howard J. Kirscher, Application of Digital Computer to Air Traffic Control in the United States, Nov./Dec. 1972

E. C. Priebee, Signal-Air Traffic Control System for Singapore. Philips Telecommunication Review, vol. 38, No. 2 Apr. 1980.

*Primary Examiner*—Gary Chin
*Attorney, Agent, or Firm*—Fish & Richardson

[57] ABSTRACT

The locations of aircraft on a first approach to a first runway are displayed on a line substantially parallel to a second approach to a second runway, the second runway converging with the first runway. The distances of aircraft on the first approach from a threshold of landing for the first runway are computed. These distances are used to draw a symbol of aircraft on the first approach onto the line parallel to the second approach at the distances from a threshold of landing for the second runway. The "mirror image" of aircraft displayed on the line parallel to the second approach will aid air traffic controllers in staggering aircraft approaching an airport on converging runways.

5 Claims, 14 Drawing Sheets

DISPLAY AID FOR AIR TRAFFIC CONTROLLERS

BACKGROUND OF THE INVENTION

This invention relates to a visual display aid for air traffic controllers.

Airport capacity is probably the most significant limiting factor in the overall capability of the air traffic control (ATC) system to handle air traffic growth. In particular, the erosion of airport capacity in instrument meteorological conditions (IMC) is the most important cause of delays in the U.S. air traffic system. A large body of work in airport capacity improvement relates to the development of procedures for multiple approaches to airports during IMC. It is generally recognized that no one of these proposed procedures provides the complete solution to the national airport capacity problem; rather each procedure offers the potential application at several airports for improving their capacities. The conduct of staggered approaches to converging runways in IMC is one way of accomplishing this needed increase in airport capacity.

If a specific time or distance relationship is not maintained between aircraft arriving on two converging streams, the approaches may be called independent or simultaneous. FIG. 1 is an example of such approaches. FIG. 2, on the other hand, is an example of staggered or "dependent" converging approaches. A distance relationship is maintained such that aircraft may not arrive at some point of concern (e.g., the missed approach point) simultaneously. The possibility of collision during a simultaneous missed approach to converging runways is by far the most significant safety issue in converging runway approaches. Staggering can resolve this issue by preventing aircraft from arriving at their missed approach points simultaneously.

Simultaneous (i.e. independent) approaches to converging or intersecting runways as shown in FIG. 1 are conducted routinely at many major airports under visual meteorological conditions (VMC), i.e., in conditions when the ceiling and visibility are greater than one thousand feet and three miles, respectively. At certain airports simultaneous approaches are conducted even in marginal IMC, e.g., when the ceiling and visibility are about seven hundred feet and two miles, or more. Whether the converging stream is discontinued when conditions drop below basic visual flight rule (VFR) conditions, or below the marginal instrument flight rule (IFR) conditions, the loss of a converging stream necessarily implies a significant loss of airport capacity.

The difficulty with staggered converging approaches is that it is not easy for controllers to stagger aircraft precisely, especially on a sustained basis. Some facilities, e.g., Boston Logan International Airport, do occassionally stagger their aircraft on converging approaches and it has been found that such staggering creates a high workload for controllers. It is hard for controllers to judge just where aircraft are and where they will be on the converging paths with respect to each other, even though some perceptual clues, such as one mile dashes on the extended runway centerlines do exist. If precise staggering is required, one may expect that the task would be even more difficult. Precise staggering, e.g., two nautical miles, would be required to realize fully the capacity benefits of staggered converging approaches. Staggering also requires coordination among controllers, which adds to the difficulty of the task. Finally, controller experience is also a relevant factor. The task is more difficult for an inexperienced controller.

SUMMARY OF THE INVENTION

The apparatus according to the invention displays the location of aircraft on a first approach to a first runway onto a line substantially parallel to a second approach to a second runway, the second runway converging with the first runway. Distances of aircraft on the first approach from a threshold of landing for the first runway are computed and these distances are used to draw a symbol onto the line parallel to the second approach at these distances from a threshold of landing for the second runway. The symbol representing the "mirror image" aircraft should be different from that of a true aircraft on an actual approach.

By displaying aircraft on one approach onto a line parallel to and near a second displayed approach, air traffic controllers can readily stagger the aircraft on the two converging approaches so as to minimize the possibility of collision during a simultaneous missed approach to both runways. The staggering facilitated by the present invention prevents aircraft from arriving at their missed approach points simultaneously.

In a preferred embodiment, the staggered converging approaches of this invention can be accommodated in the ARTSIII computer environment. The ARTS computer provides aircraft track data to an auxiliary computer which computes the distances for display through the ARTS system.

DESCRIPTION OF THE PREFERRED EMBODIMENT

Figure 1:
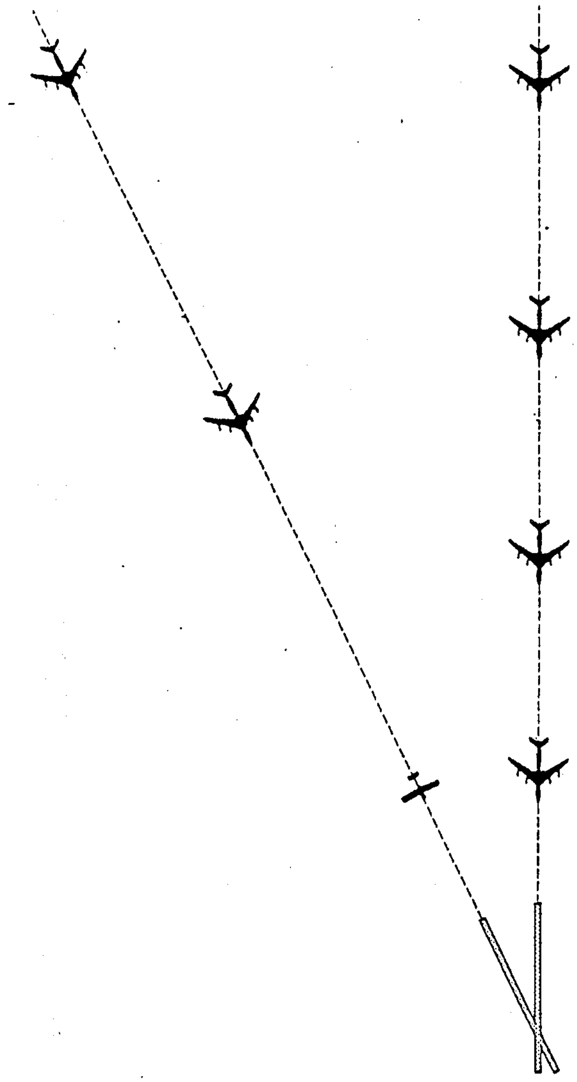
FIG. 1 is a schematic illustration showing independent converging approaches.
Figure 2:
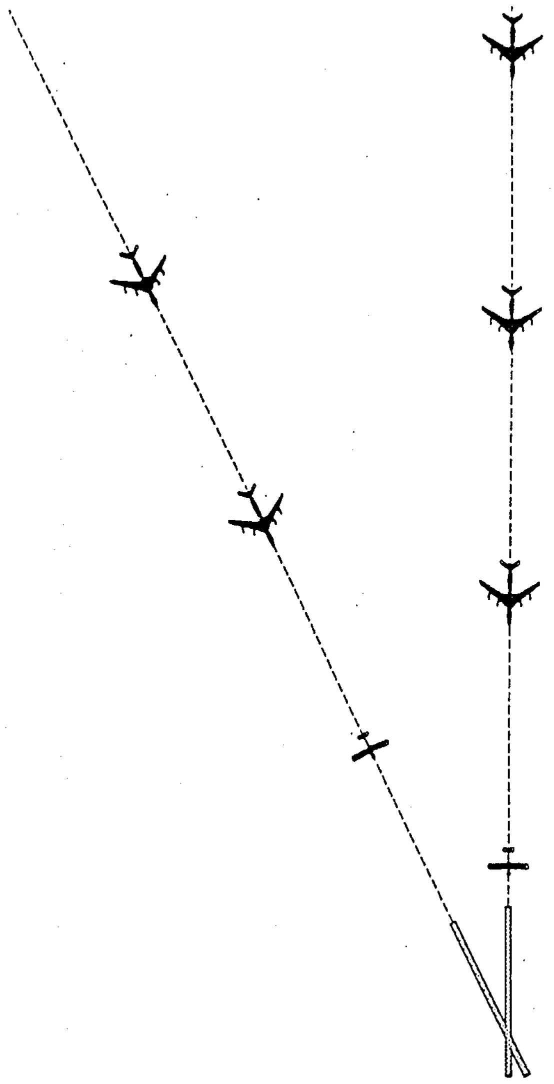
FIG. 2 is a schematic illustration showing staggered converging approaches.
Figure 3:
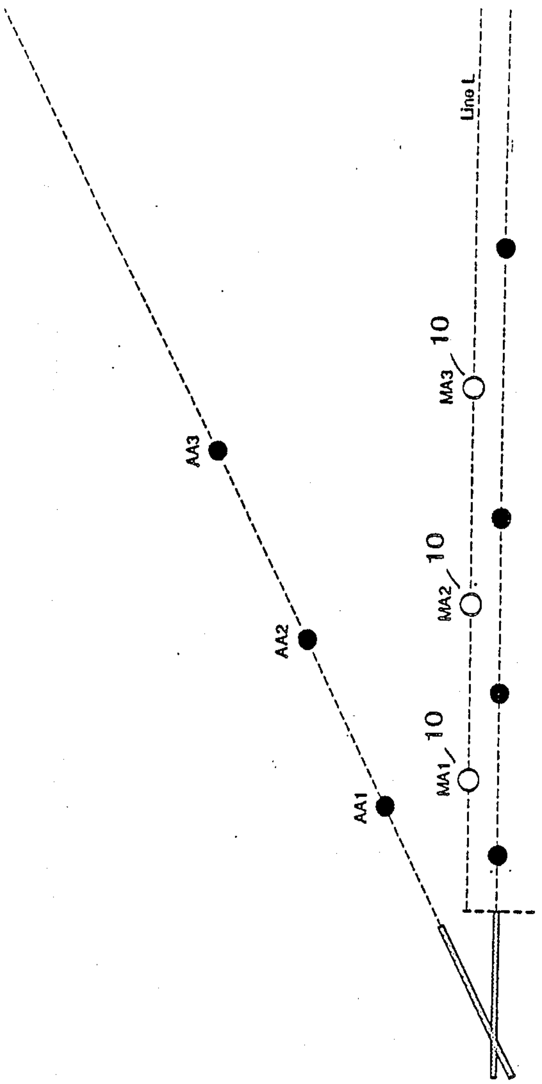
FIG. 3 is a schematic illustration of the display according to the present invention.
Figure 4:
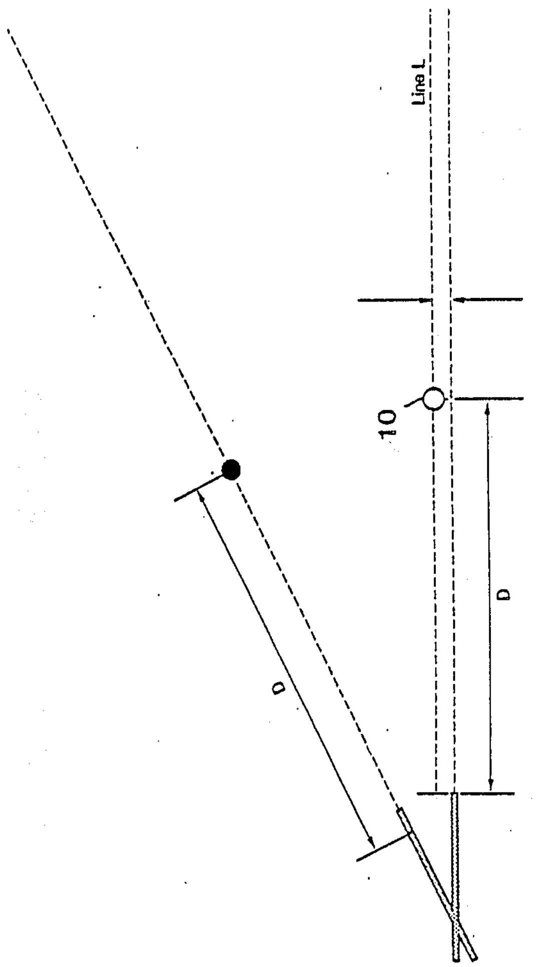
FIG. 4 is a schematic illustration of the mirror symbol location.

The design approach for the controller aid of the present invention is to convert the converging approaches geometry to simulate dependent parallel runway approaches. With reference to FIG. 3, suppose approach A and approach B are the final approach paths for two runways A and B to which converging approaches are to be conducted. Further, suppose AA1, AA2, AA3, . . . are the call signs of aircraft on final approach A, and BB1, BB2, BB3, BB4, . . . are call signs for aircraft on final approach B. MA1, MA2, MA3, . . . are mirror image symbols of aircraft AA1, AA2, AA3, . . . , respectively along a line L parallel to approach B such that the distance of the mirror image MAi from runway threshold B (FIG. 4) is equal to the distance of aircraft AAi from runway threshold A. The "mirror image" is thus a virtual aircraft or a "ghost" aircraft symbol. In FIG. 4, THRA and THRB are the landing thresholds for runway A and runway B, respectively. THRA is a displaced threshold, i.e., it is the threshold used during IFR operations. If D is the current distance along approach A of an aircraft AAi from THRA, then MAi, the mirror image of AAi on line L, should be the same distance D from THRB. The offset distance DO of the line L from approach B should be the equivalent of about one-half nautical mile or less (e.g. zero). A symbol 10 used to denote a "mirror image" aircraft should be such as to preclude any confusion with a real aircraft In this basic form of the invention, no other information is displayed beyond this mirror image symbol 10.

Figure 5:
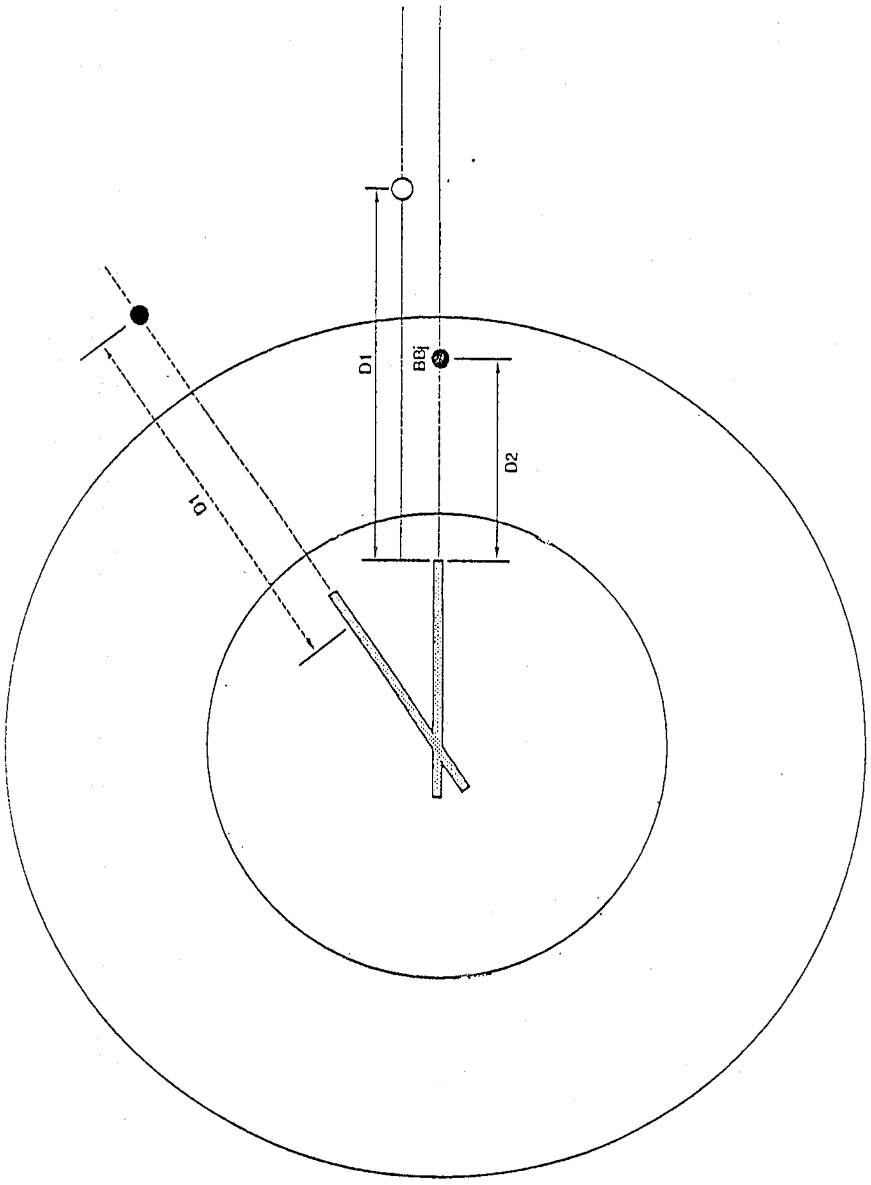
FIG. 5 is a schematic illustration showing aircraft stagger.

FIG. 5 describes "stagger". Stagger is the difference between aircraft distances to their respective runway thresholds. The stagger between two aircraft AAi and BBj on the two approaches A and B, is the same as the stagger between MAi and BBj. As aircraft progress on approach A, their mirror images progress by the same amount. Thus, in effect, the display of the invention transforms the problem of monitoring converging runway approaches into that of monitoring dependent parallel approaches. Dependent parallel approaches are conducted routinely at many major U.S. airports in IFR conditions. Since controllers can be trained to conduct dependent parallel approaches, it is expected that they can be trained to do the same with dependent converging approaches utilizing the display of the present invention. The display shown in FIG. 5 represents a modification of the display used in Automated Radar Terminal System (ARTS). The same display will also be remoted to the BRITE displays in the tower for use by the tower local controller.

TRACON controllers need to judge and control aircraft separations on final approach to establish streams with appropriate spacings for the tower controllers before hand-off. Since controllers can be trained to do this for dependent parallel approaches, it is expected that they can be trained to do the same with dependent converging approaches if required to do so utilizing the type of display shown in FIG. 5. In fact, aircraft control required for conducting staggered converging approaches may be easier than that in dependent parallel operations, since in the case of staggered converging approaches, it is only necessary to achieve the required stagger at the missed approach points. In the case of dependent parallel approaches, the stagger must be maintained over the entire final approach path.

Unlike the situation for parallel approaches, the wind component along approach A will usually be different from the wind component along approach B since the air mass is approached from different angles. In order to help controllers assimilate this difference, ground speeds may be shown in the aircraft data blocks for the "ghost" symbols.

Figure 6:
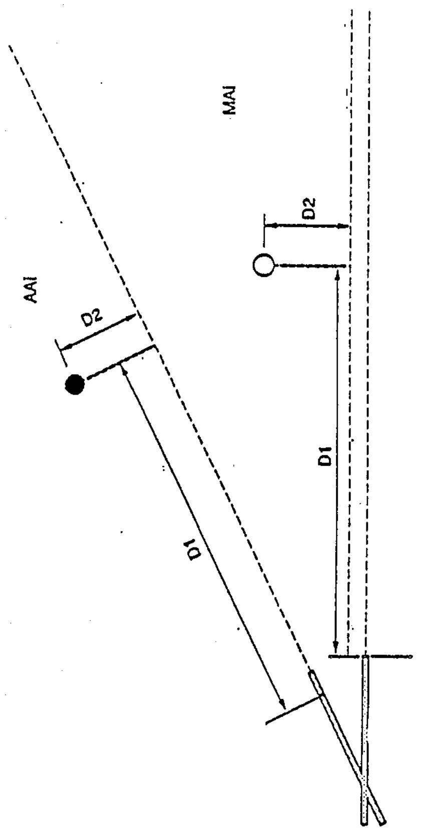
FIG. 6 is a schematic illustration showing an extension of the invention for base leg traffic.
Figure 7A:
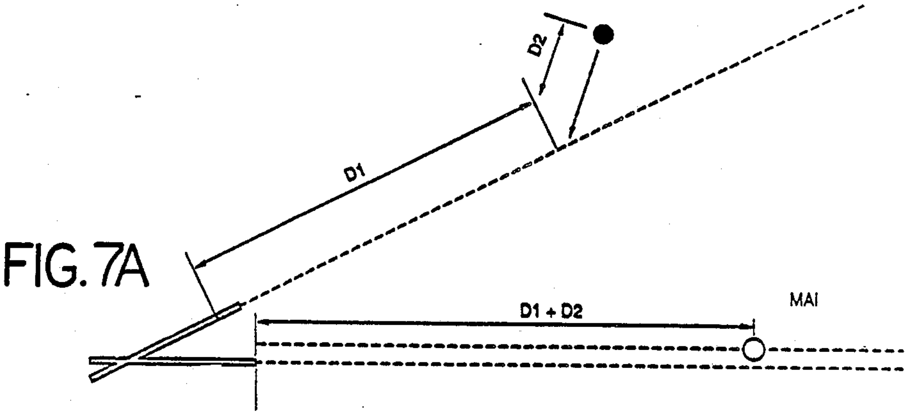
FIGS. 7*a* and 7*b* are schematic illustrations of possible extensions of the invention for base leg traffic.
Figure 7B:
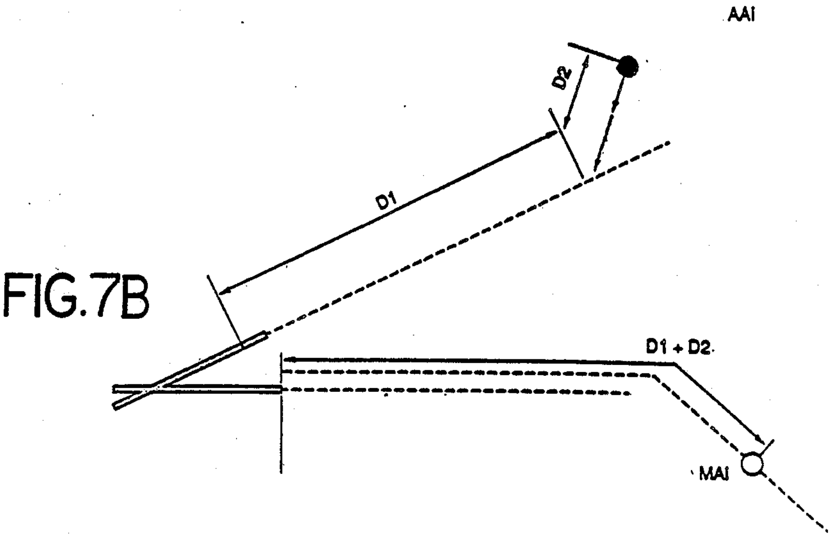

Controllers usually begin to "set up" their aircraft streams and desired aircraft separations while the aircraft are on the base leg, because depending on the length of the final approach path and the traffic situation, the final approach segment may or may not provide sufficient controllability to set up the required spacing or stagger. Therefore, mirror reflections of aircraft on base leg may also be required. FIG. 6 shows an example of a display that may be implemented. Aircraft on base to approach A are reflected as if on base approaching line L as shown.

FIGS. *7a* and *7b* show other displays which are extensions or modifications of the basic concept disclosed herein. In FIG. *7a*, the mirror image MAi is displayed at a distance D1+D2 as defined in the FIG. In FIG. *7b*, the line L itself may be "bent"along a nominal base final approach path for B.

Figure 8:
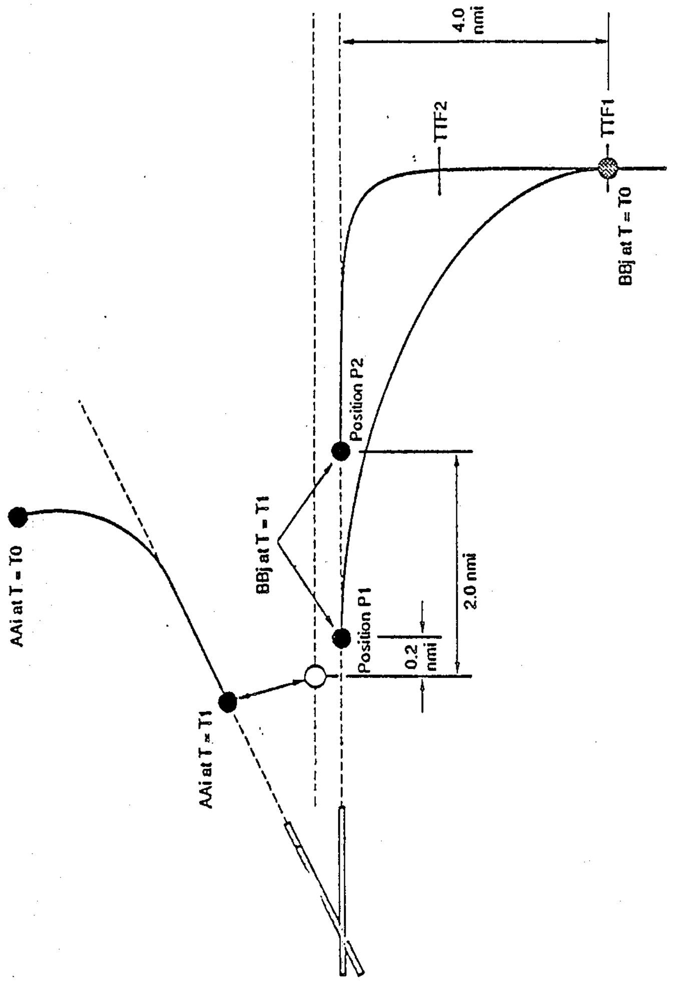
FIGS. 8 is a schematic illustration of the application of turn to final advisories for staggering.

A vector or a time to turn to final advisory may be considered for on-the job training and in the enhanced target generator (ETG) training room in TRACONS. FIG. 8 shows the effect of time to turn on achieved stagger. If aircraft BBj were turned to intercept final at time T0 at position $TTF_1$, it would arrive at position P1 at time T1. FIG. 8 shows that there would then be no stagger between AAi and BBj. If, however, aircraft BBj were to be turned to final approach at position TTF2, then at time T1 it would be at position P2, yielding a two-nautical mile stagger between AAi and BBj.

Although the present invention is expected to be used for airports when both runways of the desired converging approach configuration are equipped with ILS instrumentation, the display concept is extensible to other systems such as MLS, VOR, or RNAV approaches. Of course, new ATC procedures may have to be developed for the staggering of non-precision approaches.

Figure 9:
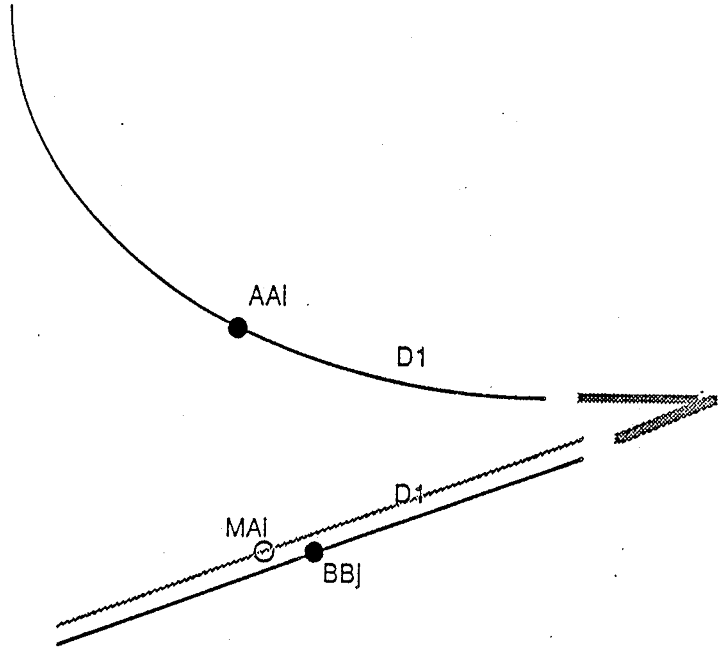
FIG. 9 is a schematic illustration of the application of the invention to curved or segmented MLS approaches.

FIG. 9 illustrates the application to curved or segmented MLS approaches. The distance D1 along the curved or segmented approach A to runway A is used to display the mirror image MAi on a line parallel to the straight in approach B to runway B, in order to enable the controller to stagger aircraft AAi and BBj.

Figure 10:
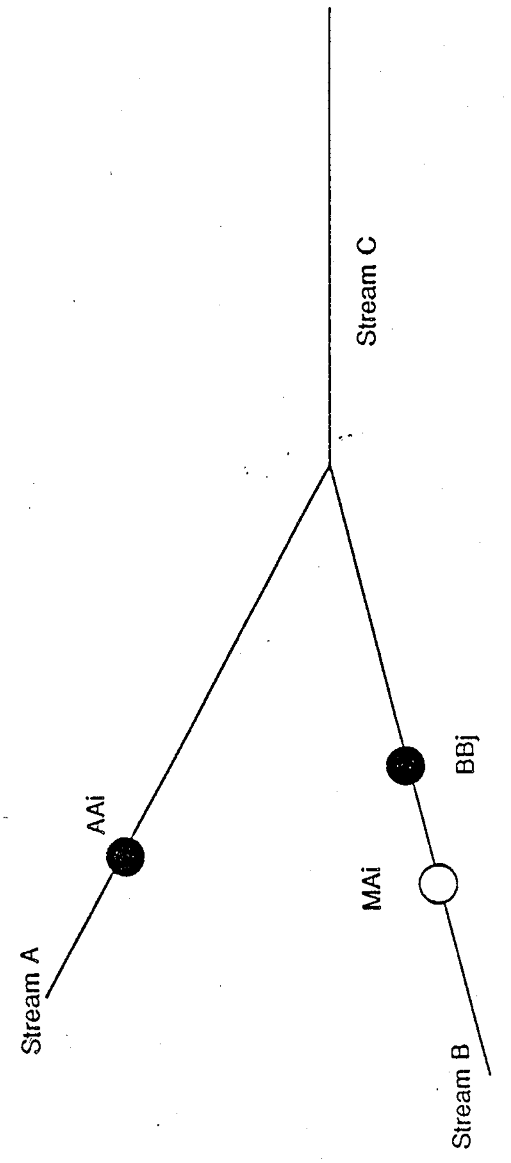
FIG. 10 is a schematic illustration of the application of the invention to a general traffic merging task.

It is expected that the present invention would be used for other air traffic merging situations where two streams of traffic are to be merged to provide a single stream. FIG. 10 shows an example of such an application for visualizing the merging and spacing of aircraft AAi and BBj on streams A and B respectively. Such tasks occur routinely in the en route air traffic environment. In that environment, the streams are usually defined by published airways; however, traffic on commonly travelled "direct vectors" may also be merged using this technique. Traffic merges in certain portions of the terminal area may similarly utilize this technique.

Figure 11:
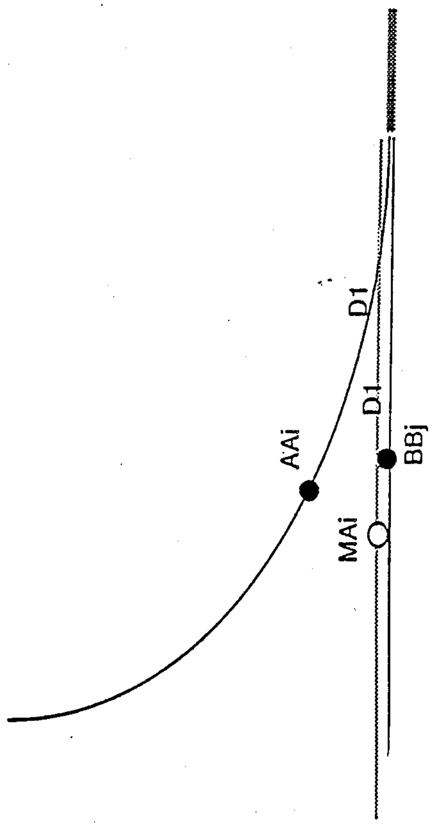
FIG. 11 is a schematic illustration of an application of the invention to curved approaches conducted with the MLS system to a single runway.

It is expected that this invention will also be useful in monitoring, merging and spacing curved approaches conducted with the Microwave Landing System (MLS). FIG. 11 shows this application. Approach A, a curved MLS approach, is being flown by aircraft AAi to a runway. Approach B, a straight in approach, is being flown by aircraft BBj to the same runway. The distance D1 from threshold along the curved approach is utilized to show a mirror image MAi on a line parallel to Approach B, so that the controller may be able to monitor AAi's progress and merge aircraft AAi and BBj.

Figure 12:
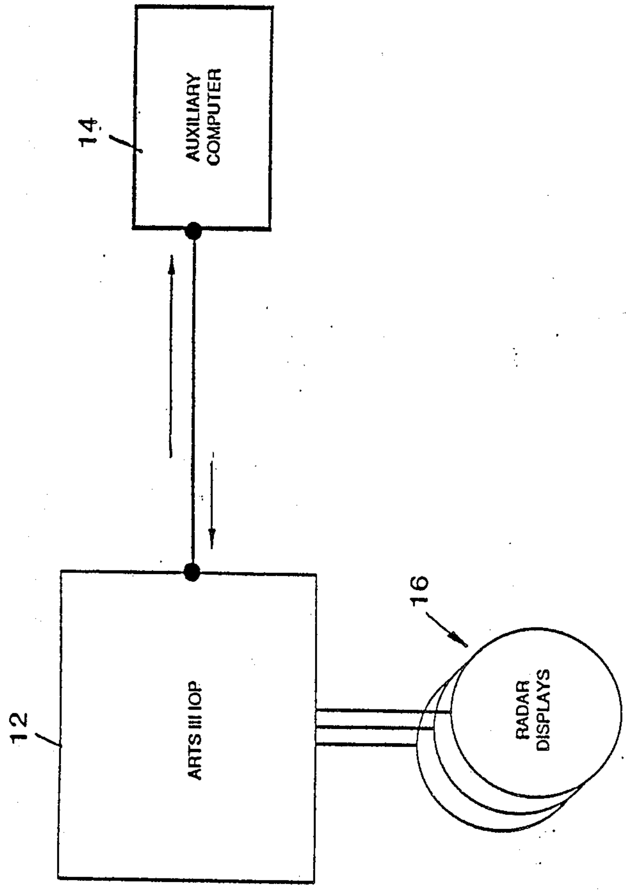
FIG. 12 is a schematic illustration of a hardware configuration with ARTSIII.

The basic hardware configuration to implement the present invention is shown in FIG. 12. The configuration in FIG. 12 is based on the existing ARTSIII environment. In this embodiment, an ARTSIII system 12, existing at all major U.S. terminals, provides aircraft track data to an auxiliary computer 14 which may be, for example, manufactured by Appollo Computer Corporation Model DN4000. The computer 14 computes the distances from a threshold on one approach and reflects this information onto the line parallel to a converging approach. The ARTSIII system 12 accepts data computed by the auxiliary computer 14 for display on ARTS display devices 16. ARTSIII systems have sixteen I/O channels per processor, usually called Input/Output Processor (IOP) "ports". Aircraft track data can be made available on an IOP port by making small software changes in order to output track data to a desired port. Of course, a single port is sufficient for both output and input. Thus, the configuration of FIG. 12 requires the availability of one IOP port to interface with the auxiliary computer 14.

Figure 13:
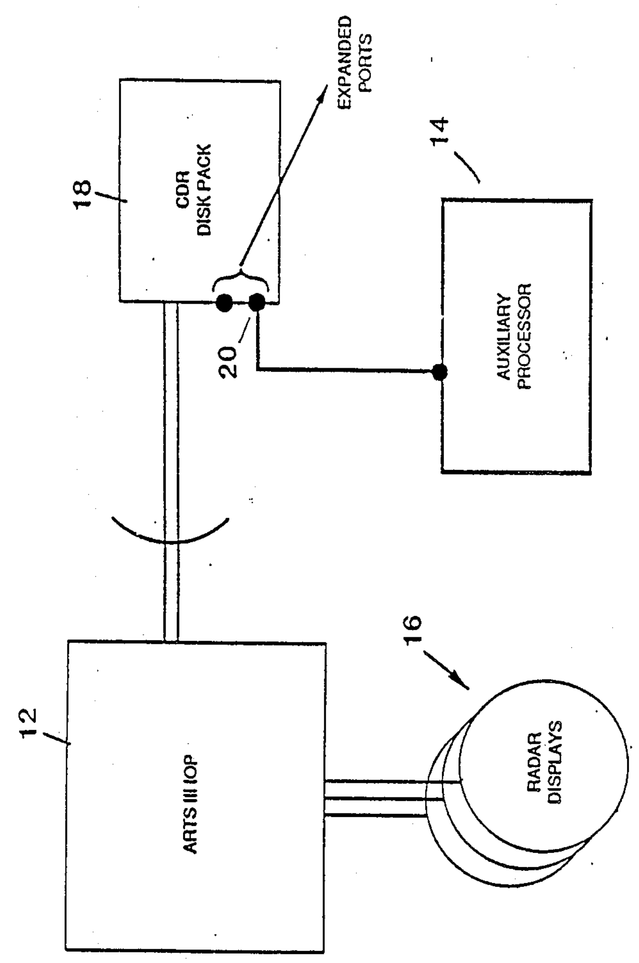
FIG. 13 is a schematic illustration for an alternate interfacing of an auxiliary processor to ARTSIII.

The availability of IOP ports is site specific. The ARTSIII systems require one IOP port for each radar display. Depending, therefore, upon the number of displays, a particular site may or may not have a free IOP port. If an IOP port were not available, the Continuous Data Recording (CDR) feature of the ARTSIII systems offers a possible solution for the input and output of data. All ARTSIIIA systems contain this CDR feature and several ARTSIII sites also have CDR. The standard CDR system interfaces with the IOP with two ports, one for the primary recording channel and one for a back-up channel. The disk controller can be expanded to a four-port configuration by the addition of a circuit board. This enables a configuration such as that shown in FIG. 13 to provide the input and output of data. All track data are continuously recorded onto a disk 18. The IOP of the ARTSIII system 12 is also capable of reading data from the disk 18. In the configuration shown in FIG. 13, one of the second set of disk ports 20 are used by the auxiliary processor 14 to read the track data just written by the IOP and to write back into the disk the processed data to be read back by the IOP for display on the radar displays 16. Currently, the disk 18 is read only at the system start up time. Some software changes would be required for routinely reading from the disk. It will also be necessary to assess whether the delays caused by the intermediary role of the disk 18 are acceptable.

Figure 14:
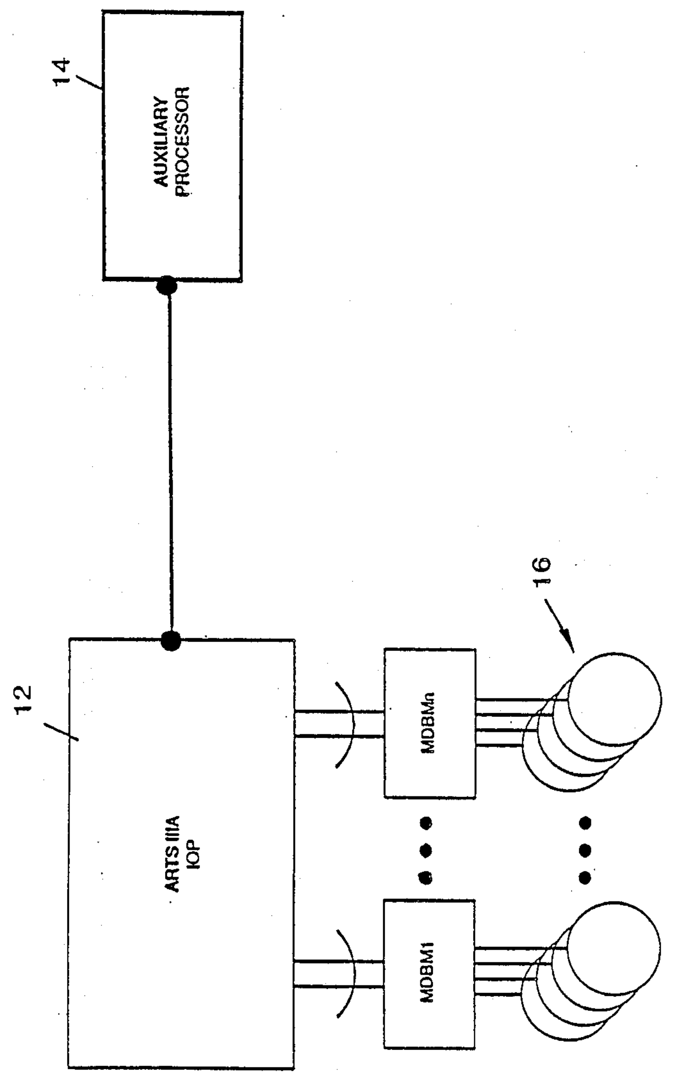
FIG. 14 is a schematic illustration of an ARTSIIIA configuration.

All ARTSIII systems are scheduled to be upgraded to ARTSIIIA systems. The ARTSIIIA system contains certain features that make it considerably more favorable for supporting an auxiliary processor. It uses memory modules called Multiplexed Display Buffer Memories (MDBMs) to refresh the radar displays. Each MDBM can refresh either four or eight displays and utilizes two IOP ports. This configuration is shown in FIG. 14. Thus, the ARTSIIIA system uses no more than half as many IOP ports for radar displays as the ARTSIII system it is upgrading. However, the ARTSIIIA utilizes a full back up architecture. Each I/O channel is backed up on a second processor. In addition, the ARTSIIIA system utilizes two ports not needed in the ARTSIII. Thus, the reduction in ports used for displays may or may not result in a net gain in free I/O ports if the ARTSIIIA upgrade uses no more than the processors already existing in the ARTSIII system. If additional processors are added in an ARTSIIIA upgrade, as they often are, a large number of unassigned ports (of the added processors) become automatically available. If necessary, the ARTSIIIA also offers another option for freeing I/O ports. The MDBMs may support either four or eight displays. Thus, if an ARTSIIIA site does not have a free port and uses MDBMs that drive four displays, two of them may be replaced by one MDBM driving eight displays. Since each MDBM uses two I/O ports, such a replacement can provide two free I/O ports.

The architecture proposed here is not expected to impact ARTSIII/IIIA processing and memory to any appreciable extent. Since the invention adds mirror-image symbols for aircraft in the base/final region, it only requires a display of those few aircraft without requiring any associated processing (such as tracking) for them. Thus, the additional workload for the ARTSIII processor is that involved in receiving position data on a few mirror image targets and outputting them for display, and an outputting of track data on all aircraft from central track store to the auxiliary processor 14. If the CDR interface option is used, as discussed in conjunction with FIG. 13, then there will also be a workload associated with reading position data from the disk 18.

It is recognized that modifications and variations of this invention will occur to those skilled in the art and it is intended that all such modifications and variations be included within the scope of the appended claims.

What is claimed is:

1. Apparatus for displaying the locations of aircraft on a first approach or first stream onto a line substantially parallel to a second approach or second stream converging with the first approach or first stream comprising:

apparatus for computing distances of aircraft on the first approach or first stream from a point of reference, such as a point of intersection of the two approaches or streams;

visual display apparatus; and apparatus for drawing on said visual display apparatus a symbol for the aircraft on the first approach or first stream onto the line parallel to the second approach or second stream at said distances from the point of reference.

2. The apparatus of claim 1 wherein said computing apparatus including an ARTSIII system and an auxiliary computer for receiving aircraft track data from the ARTSIII system, the auxiliary computer adapted to compute the distances for display on said visual display apparatus controlled by the ARTSIII system.

3. The apparatus of claim 2, wherein a continuous data recording disk, interconnected between the auxiliary computer and the ARTSIII system, is adapted to act as an interface between said auxiliary computer and said ARTSIII system.

4. Apparatus for displaying locations of aircraft on a first approach to a first runway onto a line substantially parallel to a second approach to a second runway, the second runway converging with the first runway comprising:

apparatus for computing distances of aircraft on the first approach from a threshold of landing for the first runway visual display apparatus; and apparatus for drawing on said visual display apparatus a symbol for the aircraft on the first approach onto the line parallel to the second approach at said distances from a threshold of landing for the second runway.

5. Method for displaying locations of aircraft on a first approach to a first runway onto a line substantially parallel to a second approach to a second runway, the second runway converging with the first runway comprising:

computing distances of aircraft on the first approach from a threshold of landing for the first runway by a computing apparatus; and displaying on a visual display apparatus a symbol for the aircraft on the first approach onto the line parallel to the second approach at said distances from a threshold of landing for the second runway.

* * * * *

UNITED STATES PATENT AND TRADEMARK OFFICE
CERTIFICATE OF CORRECTION

PATENT NO. : 4,890,232

DATED : December 26, 1989

INVENTOR(S) : Anand D. Mundra

It is certified that error appears in the above-identified patent and that said Letters Patent is hereby corrected as shown below:

Column 2, line 45: Change "FIGS." to -- FIG. --.
Column 3, line 21: After "aircraft" add -- . --.
Column 4, line 13: Change "base final" to -- base-final --.

Signed and Sealed this

Sixteenth Day of July, 1991

*Attest:*

HARRY F. MANBECK, JR.

*Attesting Officer*

*Commissioner of Patents and Trademarks*